United States Patent
Dayon et al.

(10) Patent No.: US 10,147,054 B2
(45) Date of Patent: Dec. 4, 2018

(54) DISPLAYING CONTENT OF AN ENTERPRISE SOCIAL NETWORK FEED ON A MOBILE DEVICE

(71) Applicant: salesforce.com, inc., San Francisco, CA (US)

(72) Inventors: Alexandre Dayon, Paris (FR); Anna Bonner Mieritz, Moss Beach, CA (US); Scott Peter Perket, San Francisco, CA (US); Richard L. Spencer, II, Seattle, WA (US); Lorne Keith Trudeau, Bainbridge Island, WA (US); Craig Villamor, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 609 days.

(21) Appl. No.: 14/336,988

(22) Filed: Jul. 21, 2014

(65) Prior Publication Data

US 2015/0032688 A1    Jan. 29, 2015

Related U.S. Application Data

(60) Provisional application No. 61/858,943, filed on Jul. 26, 2013.

(51) Int. Cl.
| | | |
|---|---|---|
| *G06F 17/00* | (2006.01) | |
| *G06F 17/30* | (2006.01) | |
| *G06Q 10/00* | (2012.01) | |

(52) U.S. Cl.
CPC ....... *G06Q 10/00* (2013.01); *G06F 17/30864* (2013.01)

(58) Field of Classification Search
CPC ......... G06F 17/30867; G06F 17/30011; G06Q 50/01; G06Q 10/10
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |

(Continued)

FOREIGN PATENT DOCUMENTS

| | | |
|---|---|---|
| WO | PCT/US2014/029355 | 4/2014 |
| WO | 2014144796 | 9/2014 |

OTHER PUBLICATIONS

U.S. Appl. No. 14/317,362, filed Jun. 27, 2014, Dayon et al.

(Continued)

*Primary Examiner* — Cheryl Lewis
(74) *Attorney, Agent, or Firm* — Weaver Austin Villeneuve & Sampson LLP

(57) ABSTRACT

Disclosed are methods, systems, and computer program products for displaying content of an enterprise social network feed on a mobile device. In some implementations, a server receives a request to display a parent container feed associated with a parent object in a hierarchical model of objects stored in a database of an on-demand service environment. The server identifies, based a plurality of criteria, a first plurality of information updates associated with a first child object having a child relationship with the parent object. The server also identifies a second plurality of information updates associated with the parent object. The server generates a first set of feed items comprising the first plurality of information updates and a second set of feed items comprising the second plurality of information updates. The server provides for display on a mobile device the first and second sets of feed items in the parent container feed.

20 Claims, 11 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,126,759 B2* | 2/2012 | Robertson ............ G06Q 10/02 705/7.19 |
| 8,145,678 B2* | 3/2012 | Ramsay, Jr. ........... G06Q 10/10 707/802 |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,332,471 B2* | 12/2012 | Harple ................... H04W 8/22 705/319 |
| 8,457,545 B2 | 6/2013 | Chan |
| 8,484,111 B2 | 7/2013 | Frankland et al. |
| 8,490,025 B2 | 7/2013 | Jakobson et al. |
| 8,499,037 B2* | 7/2013 | Ramnani ............... G06Q 30/02 709/204 |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,656,353 B2* | 2/2014 | Brendza ................. G06F 8/38 717/109 |
| 8,682,973 B2* | 3/2014 | Kikin-Gil ........... H04L 65/4015 709/204 |
| 8,788,942 B2* | 7/2014 | Jain ...................... G06Q 10/00 715/733 |
| 8,793,324 B1* | 7/2014 | Schabes ................ H04L 51/32 709/206 |
| 8,875,031 B2* | 10/2014 | Periyannan ............ H04N 7/141 715/753 |
| 9,053,079 B2* | 6/2015 | Bailor .................... G06F 17/24 |
| 9,063,632 B2 | 6/2015 | Beechuk et al. |
| 9,118,505 B2* | 8/2015 | Hungerford .......... H04L 12/585 |
| 9,148,471 B2* | 9/2015 | Beykpour ................ G09B 7/00 |
| 9,177,007 B2 | 11/2015 | Winters et al. |
| 9,311,679 B2* | 4/2016 | Shih ...................... G06Q 50/01 |
| 9,313,160 B1* | 4/2016 | Shamis .................. H04L 51/16 |
| 9,330,419 B2* | 5/2016 | Chakraborty .......... G06Q 50/01 |
| 9,336,554 B2* | 5/2016 | Ta ......................... G06Q 50/01 |
| 9,418,117 B1* | 8/2016 | Molina ............... G06F 17/3053 |
| 9,424,554 B2* | 8/2016 | Hayton ................. G06Q 10/10 |
| 9,450,898 B2* | 9/2016 | Kurupacheril ....... H04L 12/1813 |
| 9,529,488 B2 | 12/2016 | Beechuk et al. |
| 2001/0044791 A1 | 11/2001 | Richter et al. |
| 2002/0072951 A1 | 6/2002 | Lee et al. |

(56) References Cited

U.S. PATENT DOCUMENTS

| | | |
|---|---|---|
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0182563 A1* | 7/2008 | Wugofski ............. G06Q 10/10 455/414.2 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0287256 A1* | 11/2010 | Neilio ................. G06Q 10/10 709/217 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0209586 A1 | 8/2012 | Mieritz et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0033058 A1* | 1/2014 | Perotti ................. G08C 17/00 715/740 |
| 2014/0053110 A1* | 2/2014 | Brown ................. G06F 3/0481 715/853 |
| 2014/0101149 A1 | 4/2014 | Winters et al. |
| 2014/0172845 A1* | 6/2014 | Rabe ................. G06F 17/30867 707/728 |
| 2014/0201216 A1* | 7/2014 | Bryant ........... G06Q 10/063112 707/748 |
| 2014/0280329 A1 | 9/2014 | Beechuk et al. |
| 2014/0280577 A1 | 9/2014 | Beechuk et al. |
| 2014/0282143 A1* | 9/2014 | Matas ................. G06Q 50/01 715/765 |
| 2014/0310365 A1* | 10/2014 | Sample ................. H04L 51/16 709/206 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0019575 A1 | 1/2015 | Dayon et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0072750 A1* | 3/2016 | Kass ................. H04L 12/1859 709/206 |
| 2017/0199863 A1* | 7/2017 | Agrawal ............. G06F 17/246 |

OTHER PUBLICATIONS

U.S. Appl. No. 14/297,207, filed Jun. 5, 2014, Hui et al.
U.S. Appl. No. 13/943,636, filed Jul. 16, 2013, Beechuk et al.
U.S. Appl. No. 13/943,629, filed Jul. 16, 2013, Beechuk et al.
U.S. Appl. No. 13/943,640, filed Jul. 16, 2013, Beechuk et al.
U.S. Appl. No. 13/943,657, filed Jul. 16, 2013, Beechuk et al.
"Google Plus Users", Google+Ripples, Oct. 31, 2011 [retrieved on Feb. 21, 2012 from Internet at http://www.googleplusers.com/google-ripples.html], 3 pages.

\* cited by examiner

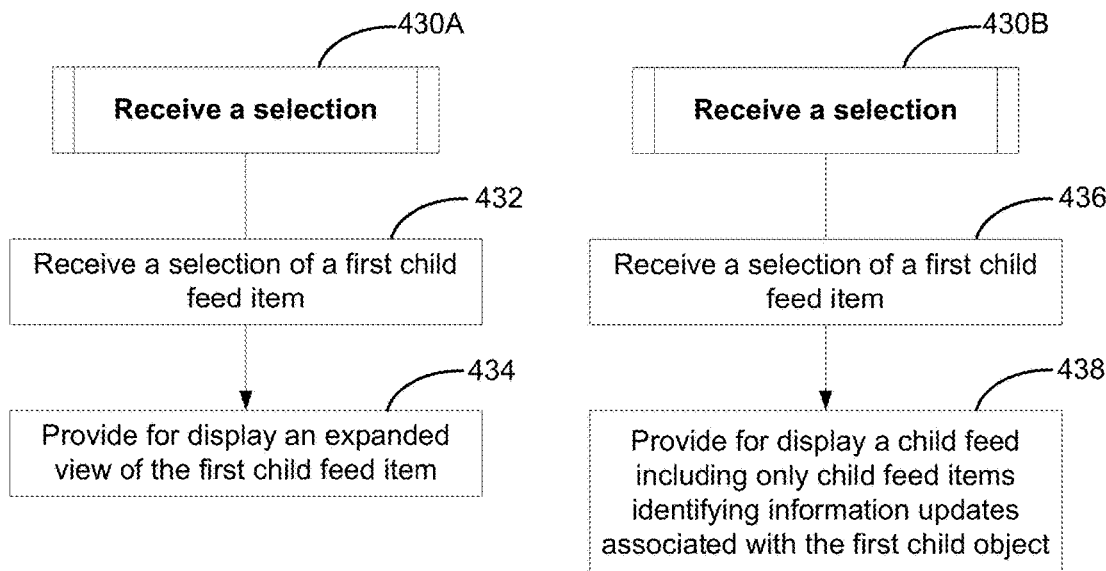
FIGURE 4A
FIGURE 4B
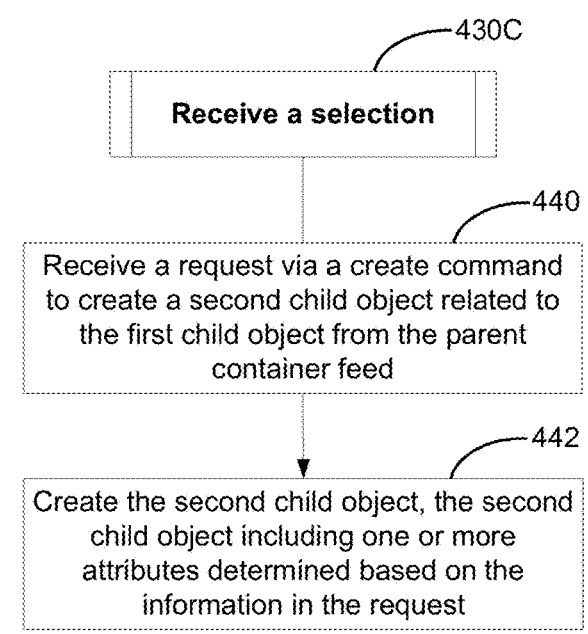
FIGURE 4C

the specific details. In other
DISPLAYING CONTENT OF AN ENTERPRISE SOCIAL NETWORK FEED ON A MOBILE DEVICE

PRIORITY DATA

This patent document claims priority to co-pending and commonly assigned U.S. Provisional Patent Application No. 61/858,943, titled "Rolling Up Related Feeds," by Dayon et al., filed on Jul. 26, 2013, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to on-demand services provided over a data network such as the Internet, and more specifically to displaying, in an enterprise social network feed, information updates associated with related objects stored in a database.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIGS. 4A-4C show flowcharts of examples of computer implemented methods 430A-430C for receiving a selection in accordance with method 330, according to some implementations.

DETAILED DESCRIPTION

Figure 1A:
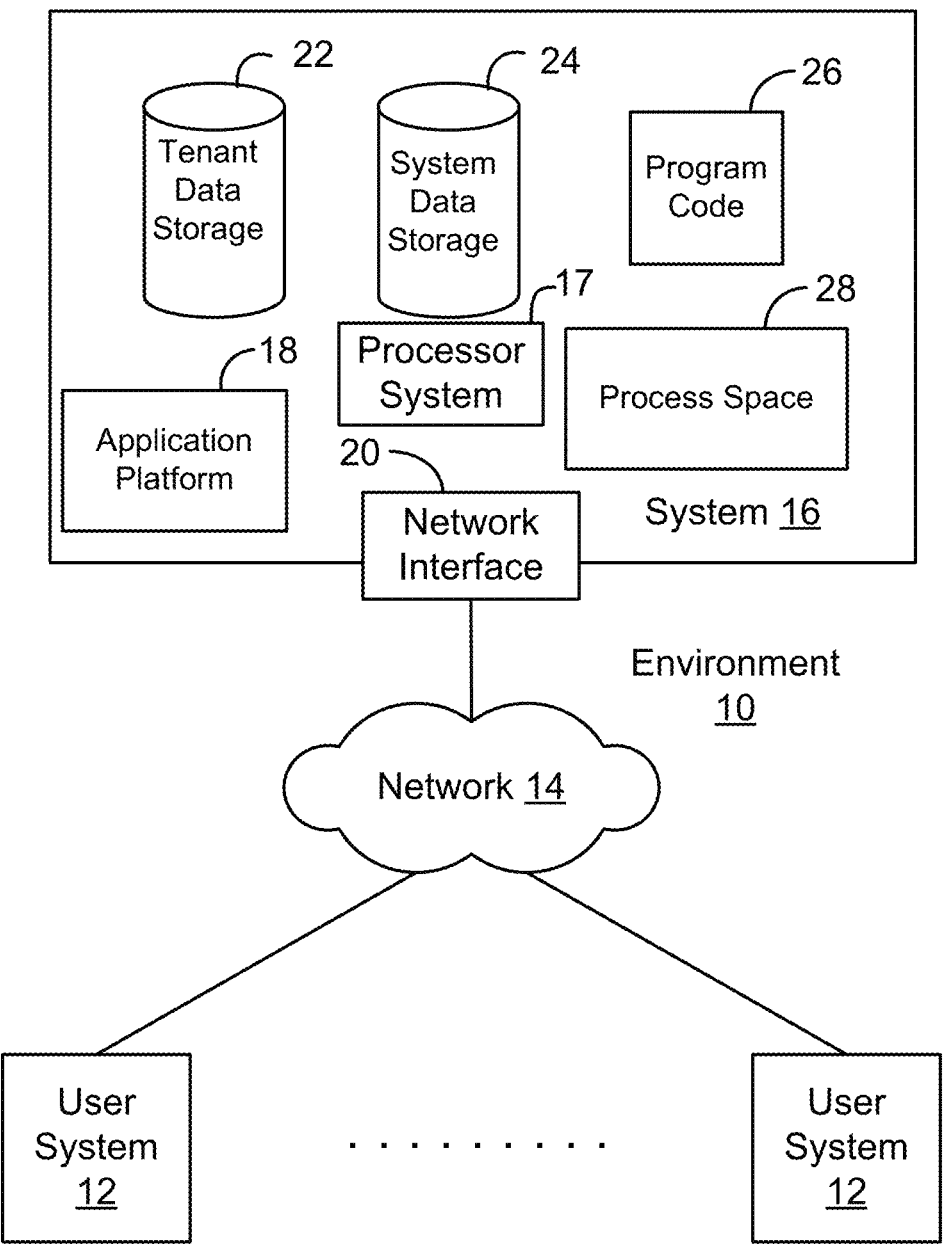
FIG. 1A shows a block diagram of an example of an environment 10 in which an on-demand database service can be used in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer program products for displaying content of an enterprise social network feed on a mobile device. The feed may be associated with an on-demand service environment, which can include various online business services and enterprise social networking services.

Enterprise social networking systems are increasingly becoming a common way to facilitate communication among people, any of whom can be recognized as users of a social networking system. One example of an enterprise social networking system is Chatter®, provided by salesforce.com, inc. of San Francisco, Calif. salesforce.com, inc. is a provider of social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some enterprise social networking systems can be implemented in various settings, including organizations. For instance, an enterprise social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some enterprise social networking systems, users can access one or more enterprise social network feeds, which include information updates presented as items or entries in the feed. Such a feed item can include a single information update or a collection of individual information updates. A feed item can include various types of data including character-based data, audio data, image data and/or video data. An enterprise social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an enterprise social networking system may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on an enterprise social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of an enterprise social network feed displayed on the user's profile page.

In some implementations, an enterprise social network feed may be specific to a group of users of an enterprise social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to an enterprise social network feed for a particular user, group, object, or other construct within an enterprise social networking system, an email notification or other type of network communication may be transmitted to all users following the user, group, or object in addition to the inclusion of the data as a feed item in one or more feeds, such as a user's profile feed, a news feed, or a record feed. In some enterprise social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

Typically, content stored outside of an on-demand database service may be difficult to access from the on-demand database service and may be limited to having to move, replicate, or provide a hyperlink to the content. In addition, access to such content may be limited as various data repositories have different APIs for access and authentication requirements. Furthermore, various content files and folders may be scattered across a plurality of different data sources. Thus, users may be limited in their ability to access, collaborate on, share, modify, comment on, search, view, and otherwise interact with content stored in external data sources in an on-demand database service.

Some on-demand service environments such as those implementing enterprise social networking systems utilize feeds for delivering information about records. For example, in Chatter®, a user can follow other users and records which are being worked on by users such that changes to the records, notifications of interactions with the records, and user commentary regarding the records and other topics may be viewed in an enterprise social network feed. Such feeds are accessible by users of mobile devices such as smartphones and tablets, desktop computers, and so forth. Collaborative tools such as Chatter® have enabled users to share and consume information in a social manner. With the proliferation of information and records that can be presented in a feed, it is desirable to present users with the most relevant and helpful feed content without requiring the user to waste time and energy searching for information. Because most feed items are displayed in a user's news feed based on whether the viewing user has "followed" other users, accounts, contacts, files, leads, etc. among other types of objects, important and other relevant feed items may be lost amongst the other feed items.

In an on-demand service environment, such as in a sales force automation (SFA) application, database objects in the form of custom objects, standard Customer Relationship Management (CRM) objects such as accounts, opportunities, leads, cases and contacts, as well as other types of objects such as groups, files, etc., may have dedicated feeds for users to collaborate with each other regarding the particular object. In a feed dedicated to a particular object, e.g. an account feed associated with a particular customer account named Acme, Inc., feed items may be generated and displayed when the particular object is updated or certain fields of the particular object are changed.

Users of an on-demand service environment may be provided with different types of feeds having relevant content published to them. A "home" feed may be a default news feed for a user, such that feed items pertaining to the records, other users, groups and other entities that the user is following appear in the home feed. A summary feed item in a home feed may display a collection of updates for a particular account. Tapping on the summary feed item, for instance, by a user touching a selection on a touch screen-equipped smartphone, may cause the account feed dedicated to that account to be displayed. Alternatively, tapping on the summary feed item may cause a container feed for the account to be displayed. The account container feed may include feed items displaying updates for the account, as well as feed items displaying updates for other objects associated with the account in the on-demand service environment. The other objects may be an opportunity or a contact, by way of example only. While a dedicated account feed for an account displays updates to the particular account, it may not display updates for other objects that are associated with the account. For a user viewing, say, an account feed for Acme, Inc., it may be desirable for the user to be able to view updates to opportunities that are related to the Acme, Inc. account in feed items alongside other feed items that display updates to the Acme, Inc. account.

In an on-demand service environment incorporating one or more databases, objects stored in a database may be identified as being related to each other. For example, opportunities may be associated with an account, and leads can be associated with an opportunity. In some implementations, database objects are arranged in a hierarchical data model such that opportunities, leads, cases, and other CRM records may be child objects of a parent object such as an account and thus be at least indirectly related to one another by virtue of being linked with the same account.

In some of the disclosed implementations, updates associated with a child object, such as a lead or an opportunity, may be "rolled up" into a container feed for a parent object such as an account associated with the child object, and displayed in feed items of the container feed. For example, when viewing an account container feed for a customer organization named General Electric® ("GE"), the GE account container feed may include feed items displaying updates for child objects of the GE account, such as open opportunities, leads, and cases related to the GE account. In some instances, the GE account container feed may also include feed items from related accounts which have pointers or other indicia identifying the GE account. In some implementations, a user may filter the GE account container feed by selecting which updates for a type of child object, such as opportunities, should be displayed and/or prioritized within the GE account container feed. In some implementations, filters and criteria such as popularity metrics may be used to determine which updates for a child object should be displayed in the parent container feed.

In some implementations, the user may also conveniently establish links or other associations among related objects using quick-create actions in a content publisher of the container feed. These actions may be customized for the specific container feed being viewed. In some implementations, an administrator may customize the quick-create actions that are accessible from the feed. In some other implementations, quick-create actions may be predetermined based on the type of container feed being viewed.

When an account container feed is displayed on a mobile device, by way of example, the account container feed may include feed items indicating updates on records associated with the account, such as an opportunity that is a child of the parent account. Upon selection of one of the feed items displayed in the account container feed, the feed item may expand to display more detailed information about the opportunity, such as one or more action items for the opportunity created by other users of the on-demand service environment. In some implementations, the action items may be one or more tasks assigned to be performed by a user with regard to the opportunity. The feed item may include a list of the one or more tasks grouped into the single feed item. Selection of the tasks list feed item may provide additional details for the tasks.

In another implementation, the account container feed may display a "hero post" feed item that highlights a particular update related to a child opportunity linked with the parent account. For example, a value for an opportunity related to the account may have been changed to $10,000,000. The hero post feed item may be generated if the update meets a designated threshold, such as an opportunity value of greater than or equal to $1,000,000, or some other threshold. The hero post may be graphically accentuated with a bright color that distinguishes it from other content in the feed, by way of example. The thresholds and graphical representations of the hero post feed item may be customized by administrators or users in some implementations. When the hero post is selected, the feed item may expand to display one or more updates associated with the hero post. In addition to providing content display within the hero post for the opportunity in the account container feed, various implementations may also allow a user to navigate from the account container feed to the child opportunity feed associated with the hero post by selecting the hero post displayed in the account container feed.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "enterprise social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different enterprise social network feeds. A second user following a first user and a record can receive the feed items associated with the first user and the record for display in the second user's news feed, which is another type of enterprise social network feed. In some implementations, the feed items from any number of followed users and records can be combined into a single enterprise social network feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s).

Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
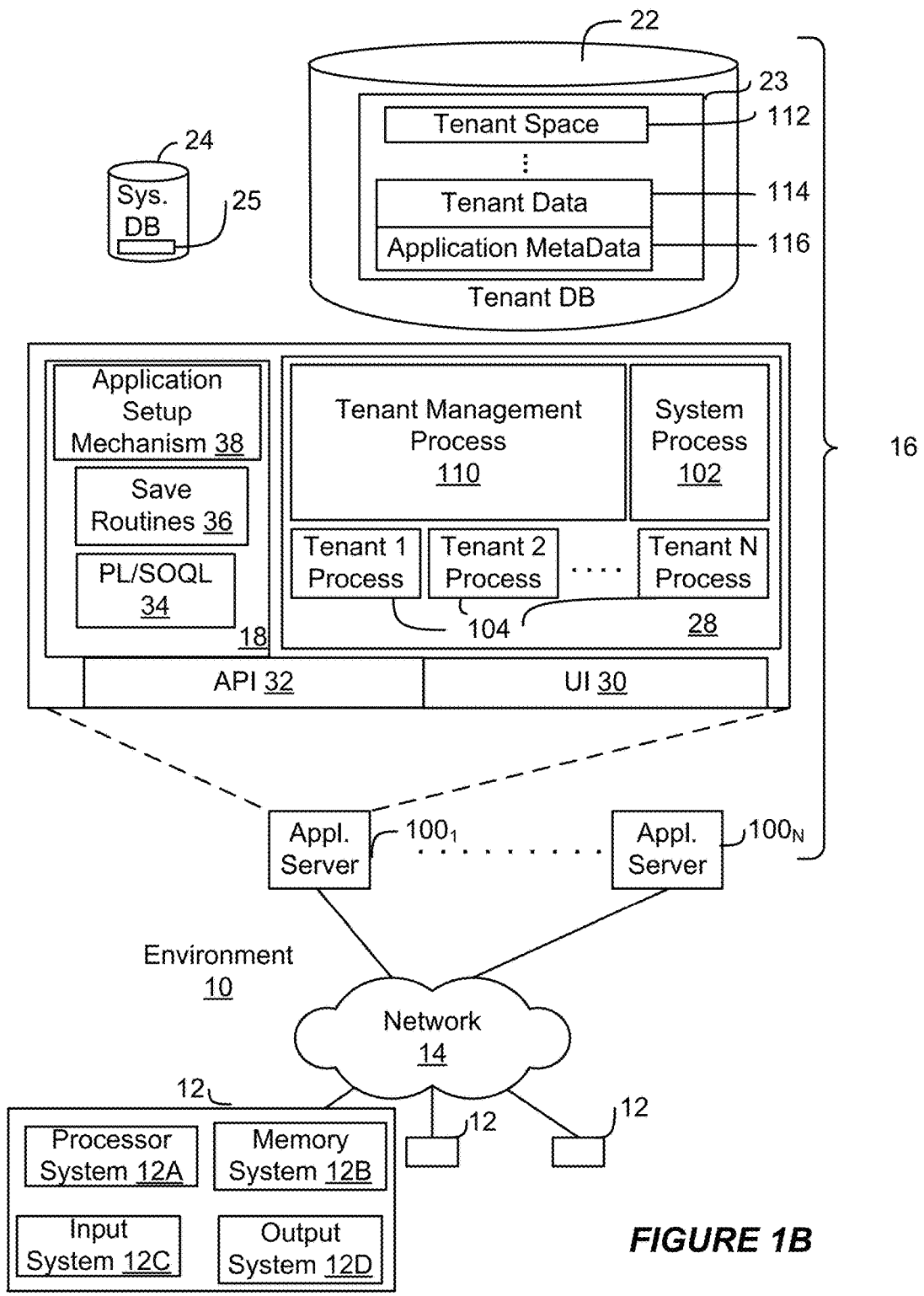
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle| databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100₁ might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
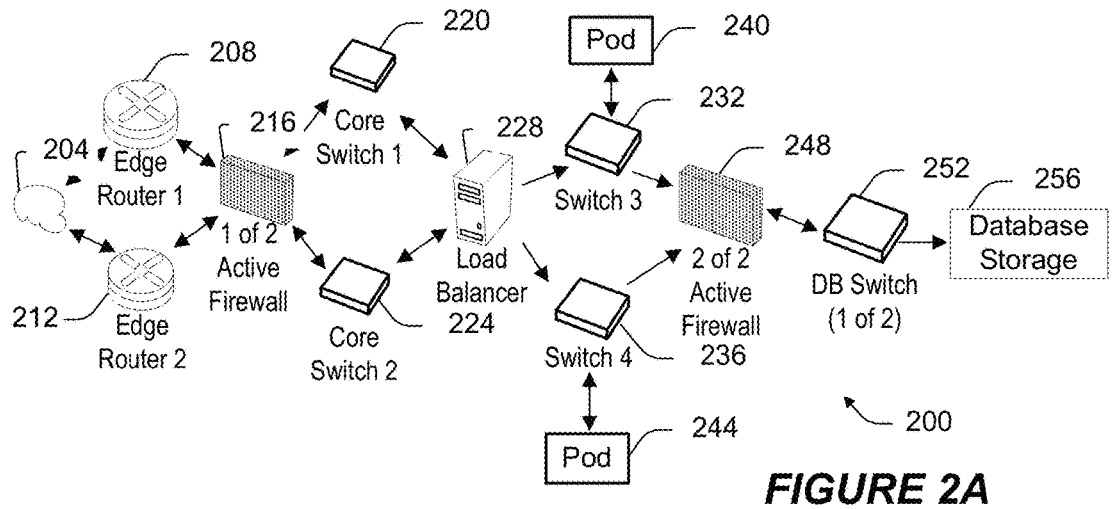
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
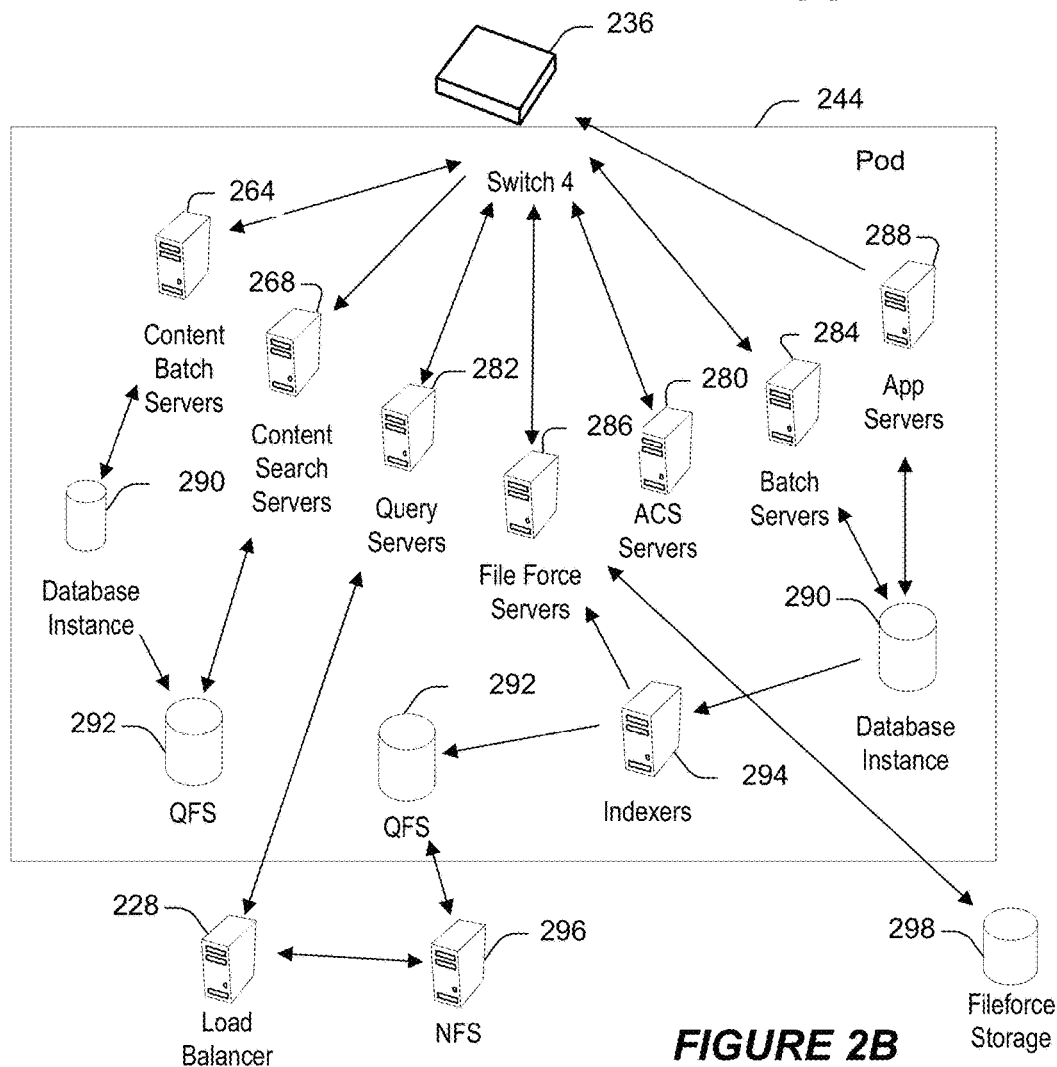
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-9B. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Displaying Content of an Enterprise Social Network Feed on a Mobile Device

Figure 3:
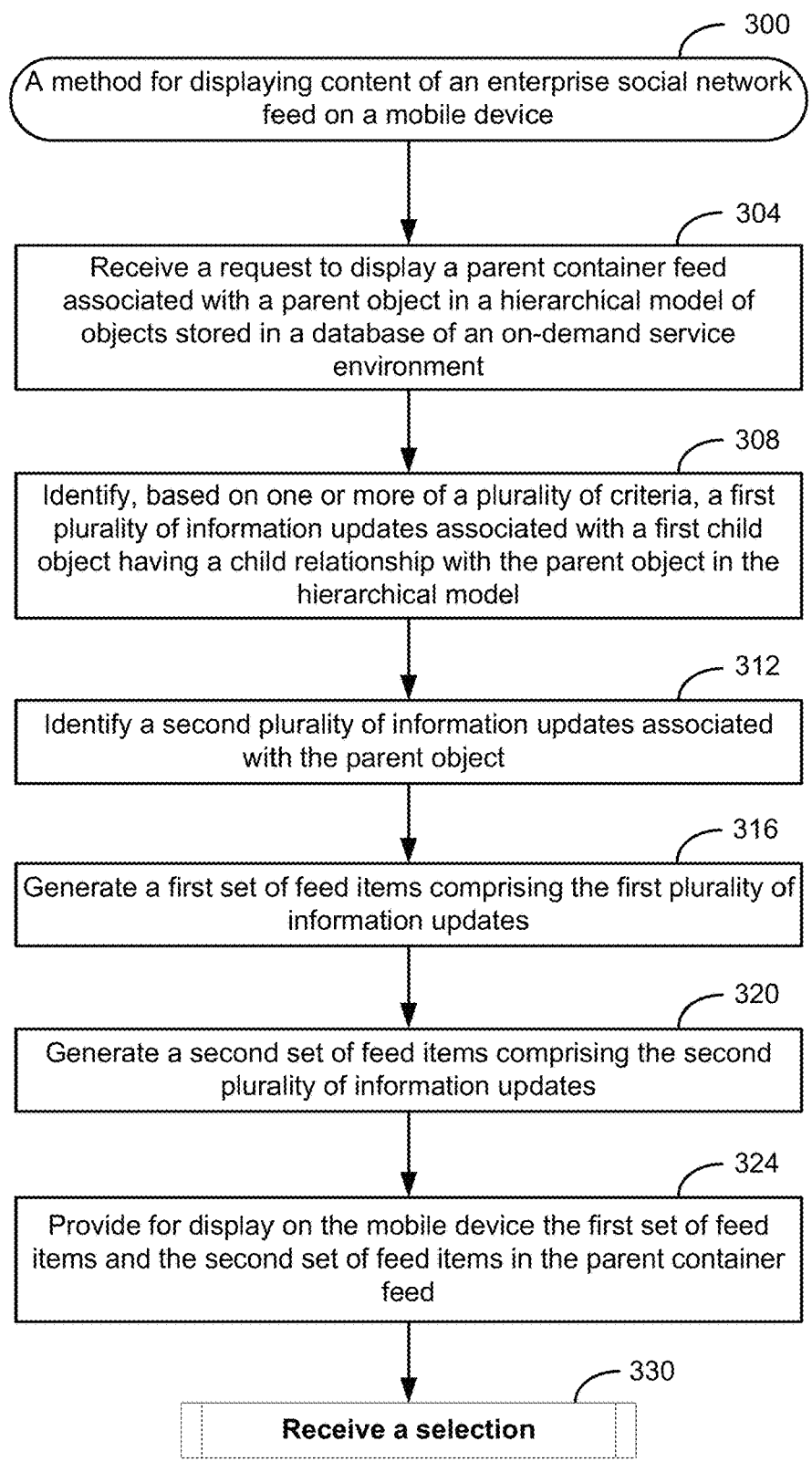
FIG. 3 shows a flowchart of an example of a computer implemented method 300 for displaying content of an enterprise social network feed on a mobile device, according to some implementations.

FIG. 3 shows a flowchart of an example of a computer implemented method 300 for displaying content of an enterprise social network feed on a mobile device, according to some implementations. The method 300 can be performed by or using any suitable computing device, computing system or any number of computing devices or systems that may cooperate to perform the method 300. In some implementations, each of the blocks of the method 300 can be performed wholly or partially by or using the database system 16 of FIGS. 1A and 1B, or other suitable devices or components (including processors) described herein, or the like.

In FIG. 3, at block 304, a computing device such as a server or a mobile device operated by a user receives a request to display a parent container feed associated with a parent object in a hierarchical model of objects stored in a database of an on-demand service environment. The parent container feed is configured to include feed items identifying information updates associated with the parent object. The parent container feed may also be configured to include feed items based on information updates associated with one or more child objects related to the parent object in the hierarchical model.

Because a parent container feed, in addition to including feed items reporting updates to the parent object, also includes feed items reporting updates to one or more child objects of the parent object, the container feed can be differentiated from a dedicated feed associated with an object, which only displays updates directly pertaining to the object. For example, a parent container feed for the Acme, Inc. account would include feed items with record updates to or posts regarding the Acme, Inc. account and include feed items related to cases, opportunities, leads, etc., which are child objects of the Acme, Inc. account. However, a feed dedicated to the Acme, Inc. account, referred to herein as the Acme, Inc. account feed, would include feed items with record updates to or posts regarding the Acme, Inc. account but exclude feed items related to cases, opportunities, leads, etc. of the Acme, Inc. account. By the same token, each child object of the Acme, Inc. account can have a dedicated feed with feed items reporting updates to only that child object.

A parent container feed may be based on any parent object having one or more child objects in the on-demand service environment. An account container feed is an example of a parent container feed because an account has child objects, such as cases, opportunities, and leads, and updates to those child objects may be rolled up into the account container feed. In some implementations, an opportunity may be a parent object with child objects such as a task or an event. Any of the various objects disclosed herein can serve as a parent object. Thus, a parent container feed can be in the form of: an account container feed, an opportunity container feed, a contact container feed, a lead container feed, a case container feed, a report container feed, a task container feed, an event container feed, a dashboard container feed, and an asset container feed, by way of non-limiting example. As an example of an opportunity container feed, an opportunity may be associated with one or more tasks, wherein the opportunity is a parent object and the tasks are child objects. As such, updates to the one or more child tasks for the parent opportunity may be rolled up and displayed in the opportunity container feed. In some implementations, a child object can be in the form of a standard CRM object or a custom object having a child relationship with a parent object such as an account. In some implementations, a first child object may have a child relationship with only one parent object in the hierarchical model. As an example, an opportunity may only be related with a single account object. In other implementations, a first child object may have a child relationship with a plurality of parent objects in the hierarchical model.

In some implementations, one or more feed items displayed as part of a feed in a user interface on a display of a mobile device is graphically represented in the form of a "card", also referred to herein as a "mobile card." In one non-limiting example, a mobile card can be configured to include information updates to or regarding properties of the parent object. Other examples of mobile cards are illustrated in the Figures and described in greater detail below.

The feed items reporting information updates associated with a child object may summarize any number of information updates to or about the child object. For example, the information updates may identify three different tasks assigned to the user for an opportunity, which is a child of a parent account object. In some implementations, the three tasks may be displayed in a task list in a single feed item in the account container feed.

Figure 5:
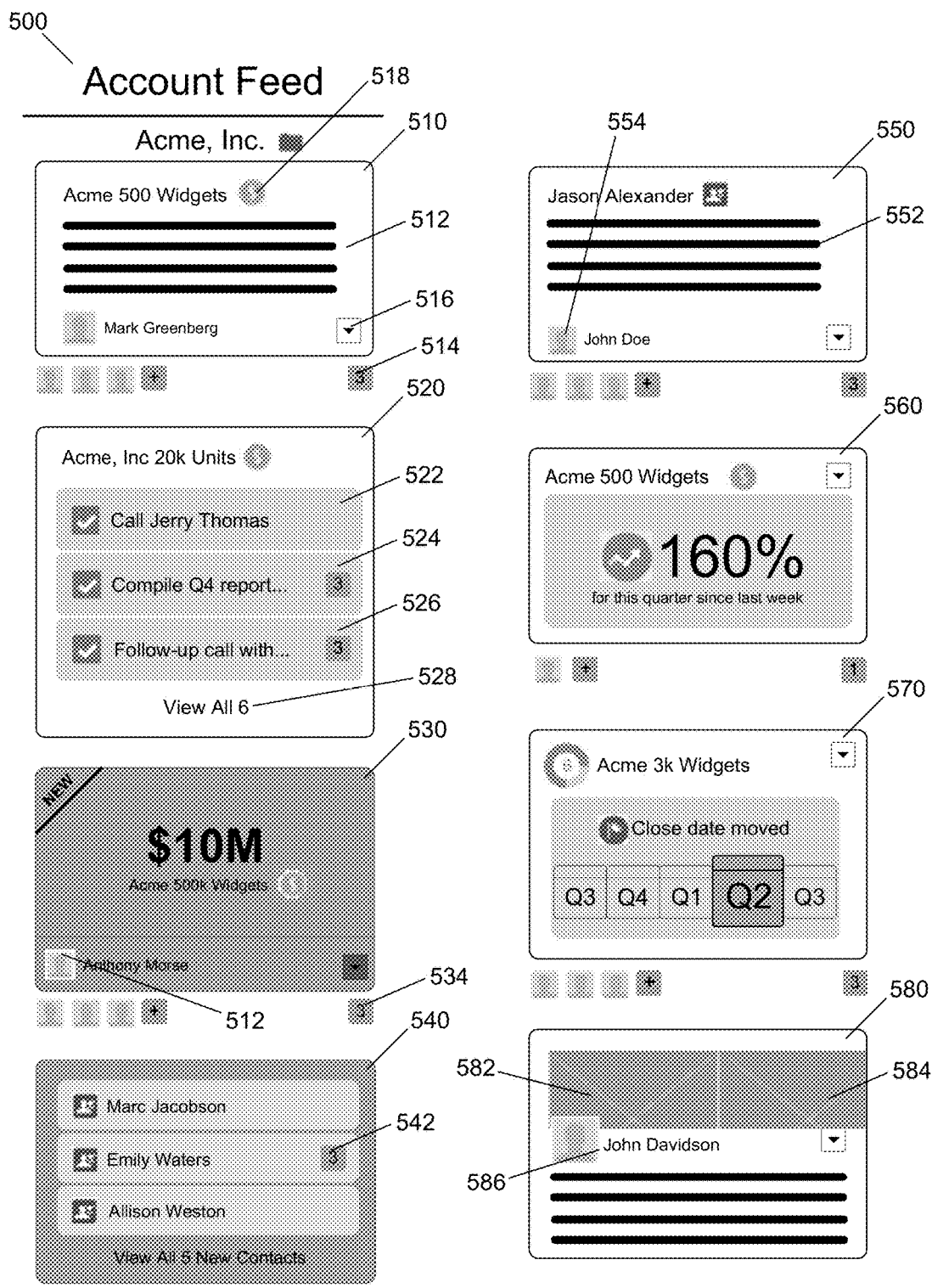
FIG. 5 shows an example of a graphical user interface (GUI) displaying an account container feed, according to some implementations.

FIG. 5 shows an example of a graphical user interface (GUI) displaying an account container feed, according to some implementations. FIG. 5 illustrates an example of an account container feed 500 for Acme, Inc. showing various mobile cards 510, 520, 530, 540, 550, 560, 570 and 580. Some of the cards include content directly related to the Acme, Inc. account, while other cards include content with updates to or about objects related to the Acme, Inc. account, such as child opportunities and contacts of the Acme, Inc. account. Each of the mobile cards of FIG. 5 may be browsed on a mobile device by swiping among the mobile cards. In some implementations, the mobile cards are presented in FIG. 5 as a scroll in a vertical or horizontal sequence. The first mobile card 510 displays information about an opportunity named "Acme 500 Widgets", which is a child of the Acme, Inc. account. The first mobile card 510 may display a note 512 describing a phone call about the "Acme 500 Widgets" opportunity and indicate a number of information updates 514 reported by the first mobile card 510. A "show more" button 516 may cause the first mobile card 510 to expand to display more detailed information about the note 512 and updates 514 about the "Acme 500 Widgets" opportunity. An opportunity icon 518 indicates that the information displayed in the mobile card is associated with an opportunity object, as opposed to the account object associated with the account container feed.

Figure 6A:
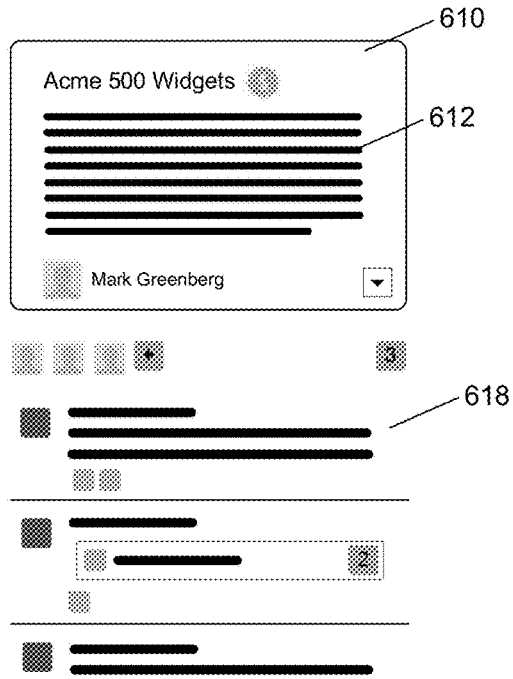
FIGS. 6A-6E show examples of expanded views of individual feed items of an account container feed, according to some implementations.

FIGS. 6A-6E show examples of expanded views of individual feed items of an account container feed, according to some implementations. FIG. 6A shows an example 610 of an expanded view of the first mobile card 510 of FIG. 5. The expanded view shows the three information updates 618 associated with the note 612, which is an expanded view of note 512 of FIG. 5. The three information updates 618 may include comments posted by other users in response to the note 612 created by Mark Greenberg.

Figure 6B:
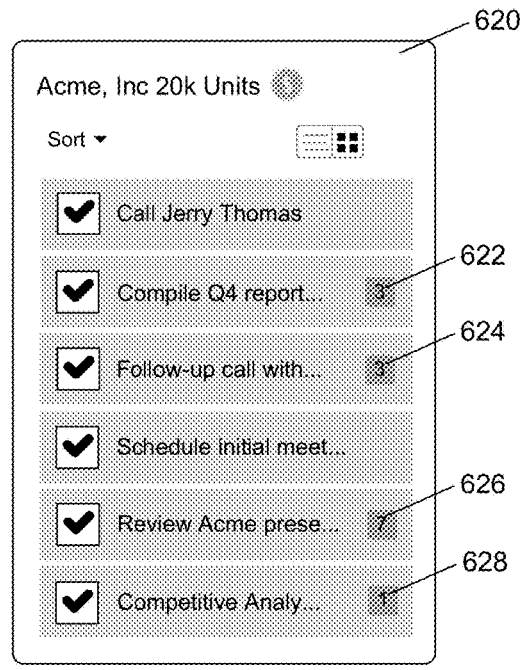

Returning to FIG. 5, the second mobile card 520 displays a task list for an opportunity, "Acme, Inc. 20 k Units", which is a child of the Acme, Inc. account. The task list includes a "Call Jerry Thomas" task 522, a "Compile Q4 report . . . " task 524, and a "Follow-up call with . . . " task 526. The clumped task list also includes a "View all" selection 528 that may cause the second mobile card 520 to be expanded to view all of the tasks in the list. FIG. 6B shows an example 620 of an expanded view of the second mobile card 520 of FIG. 5. The expanded view displays all of the tasks of the task list, along with notifications 622, 624, 626 and 628 of any number of updates for a given task. As a result, a viewing user may work directly from this expanded view and be provided with relevant updates for this opportunity via the account container feed.

Figure 6C:
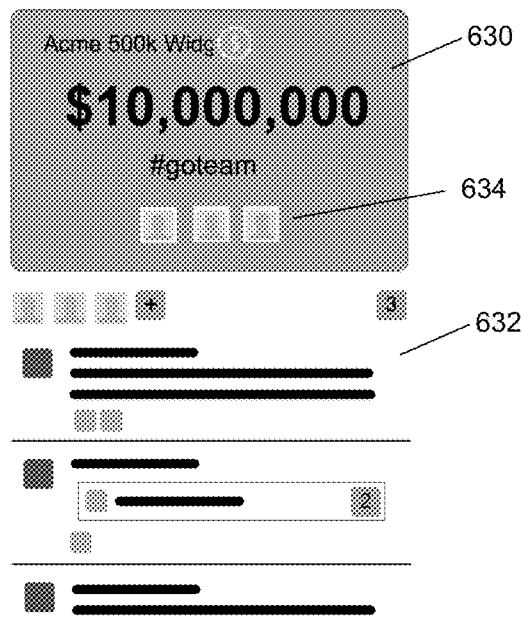

Returning to FIG. 5, the third mobile card 530 displays a "hero post" with an indication that the value for the "Acme 500 k Widgets" opportunity has been changed to $10,000,000. The third mobile card 530 also indicates a user, "Anthony Morse," who was the salesperson responsible for the opportunity value change and a number of information updates 534 associated with the change. FIG. 6C shows an example 630 of an expanded view of the third mobile card 530 of FIG. 5. The expanded view displays the three information updates 632 associated with the opportunity value change. The expanded view may also provide additional information regarding users working on the opportunity who participated on work resulting in the opportunity value change. The font, style, color, and design of the hero post may be customized by users of the on-demand service environment to highlight the hero post and distinguish it from other contents of the account container feed 500 of FIG. 5.

Figure 6D:

Returning to FIG. 5, the fourth mobile card 540 displays a notification that indicates that five new contacts—Marc Jacobson, Emily Waters, Allison Weston, and two others—have been added as child objects to the Acme, Inc. account. The notification also indicates that there are three information updates 542 associated with the Emily Waters contact. Instead of displaying five separate mobile cards to indicate that each contact has been added, the information has been summarized in a single card 540. In some implementations, a card may utilize a specific color assigned for the particular type of record, such as tasks or contacts, so that the viewing user may quickly scan the feed to find relevant content. FIG. 6D shows an example 640 of an expanded view of the fourth mobile card 540 of FIG. 5. The expanded view shows each of the five new contacts 642, 644, etc. with additional information related to each contact, such as the contact's position within the company, specific contact information, and information updates associated with each contact. In some implementations, selecting one of the five contacts in the expanded view may retrieve details of that particular contact to be displayed in a single mobile card.

Returning to FIG. 5, the fifth mobile card 550 displays notes 552 for a particular contact, "Jason Alexander." As an example, the user John Doe 554 may have met with Jason Alexander and created notes in the contact record for Jason Alexander.

In FIG. 5, the sixth and seventh mobile cards 560 and 570 display different types of notifications. The sixth mobile card 560 is for the opportunity "Acme 500 Widgets" associated with the Acme, Inc. account. This card 560 is in the form of a hero post indicating that the value for the "Acme 500 Widgets" opportunity increased by 160%. The seventh mobile card 570 displays a notification for an "Acme 3 k Widgets" opportunity, which is another child object of the Acme, Inc. account feed, and the notification indicates that the close date for the opportunity has been changed to the second quarter of next year.

Figure 6E:
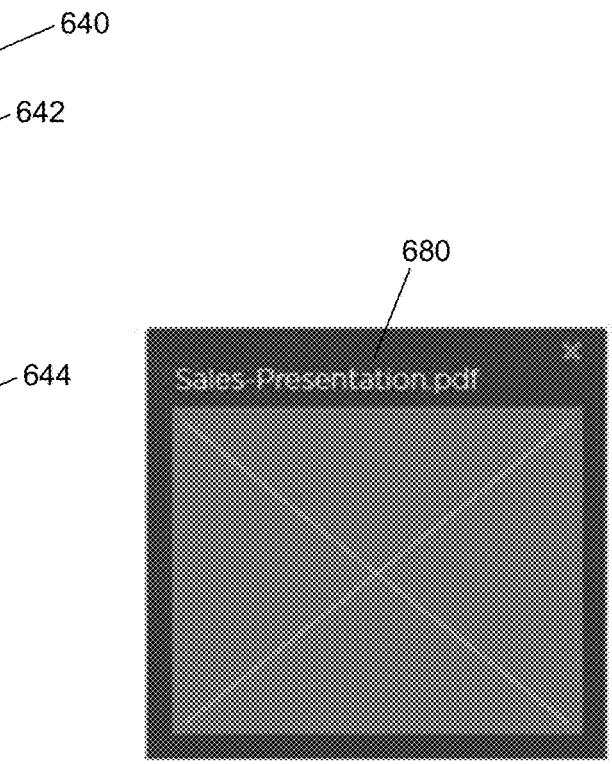

In FIG. 5, the eighth mobile card 580 displays previews of one or more files 582, 584 related to the Acme, Inc. account. The files in this example were uploaded as attachments to posts by "John Davidson" 586, a user of the on-demand service environment. Upon selection of the card 580, the user may be presented with the attached files in an immersive display in some implementations. FIG. 6E shows an example 680 of what may be presented to a user in the mobile device display when one of the attached files is selected for display.

Returning to the Acme, Inc. account container feed 500, the first, second, third, sixth and seventh mobile cards 510, 520, 530, 560 and 570 display information from updates to or about opportunities which are child objects of the Acme, Inc. account. Updates regarding the "Acme 500 Widgets", "Acme, Inc. 20 k Units", and "Acme 3 k Widgets" opportunities have been rolled up into the Acme, Inc. account container feed. The fifth mobile card 550 displays an update to a contact record that is a child of the Acme, Inc. account. The fourth and eighth mobile cards 540 and 580 of the account container feed 500 display information from updates associated with the Acme, Inc. account. In the case of the fourth 540 and eighth 580 mobile cards, the mobile cards provide a summary of one or more information updates of the parent Acme, Inc. account object. These updates for the parent account object are displayed in a single Acme, Inc. parent container feed along with the updates for the child opportunities—"Acme 500 Widgets," "Acme, Inc. 20 k Units," and "Acme 3 k Widgets." One or more criteria may be used to determine whether to display any of these mobile cards in the account container feed. These criteria are discussed further below with respect to block 316 of FIG. 3.

Figure 7:
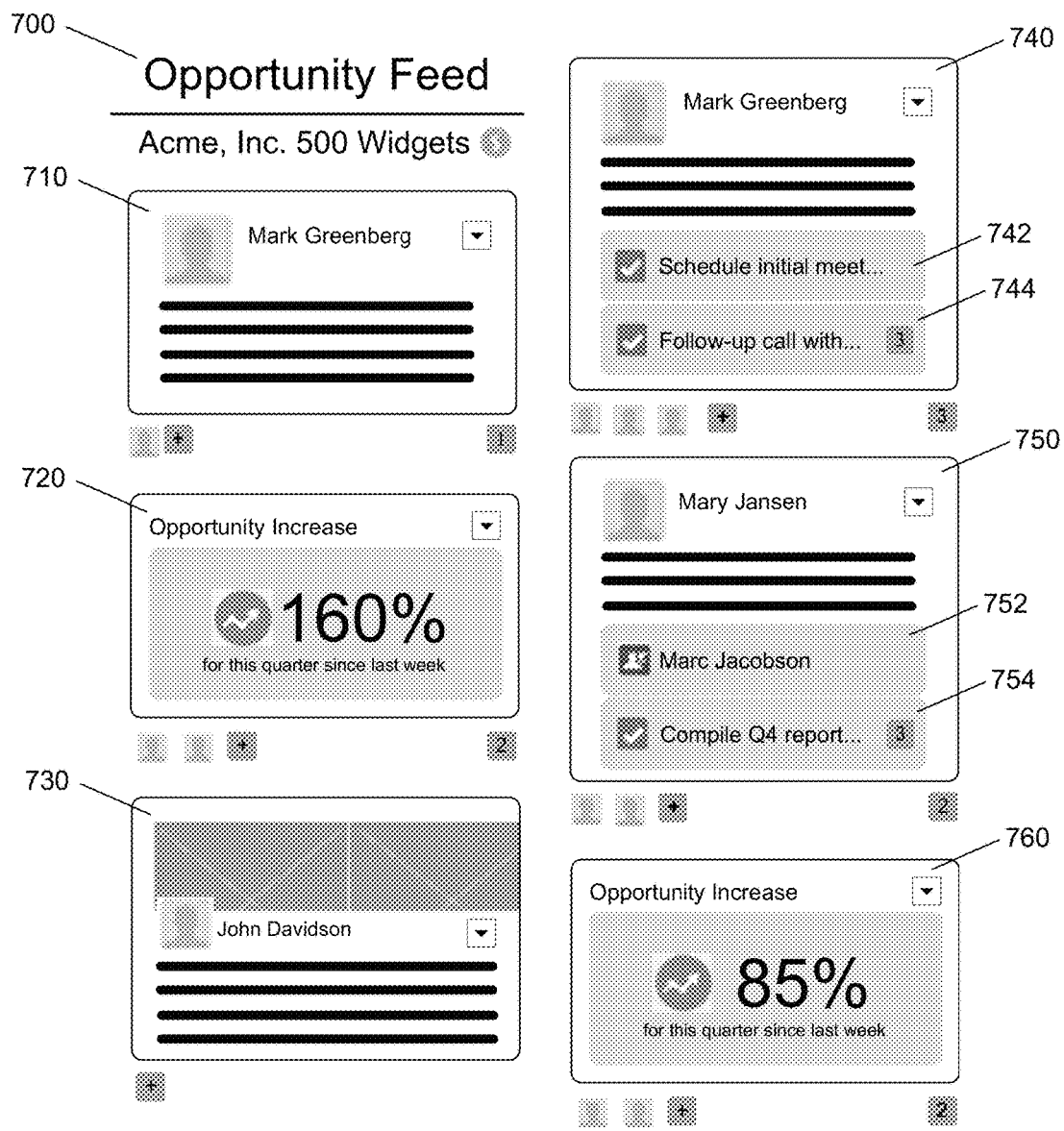
FIG. 7 shows an example of a GUI 700 displaying an opportunity feed, according to some implementations.

FIG. 7 shows an example of a GUI 700 displaying an opportunity feed, according to some implementations. FIG. 7 illustrates an example of an Opportunity Feed 700 for the "Acme, Inc. 500 Widgets" opportunity showing various mobile cards 710, 720, 730, 740, 750, 760 and 770 displaying on a mobile device content related to the "Acme, Inc. 500 Widgets" opportunity.

Figure 8A:
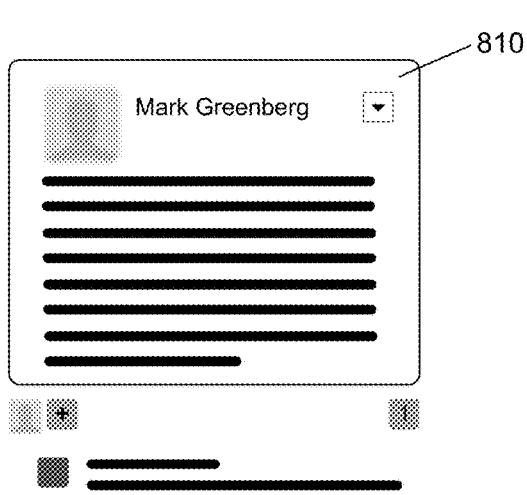
FIGS. 8A-8D show examples of expanded views of individual feed items of an opportunity feed, according to some implementations.

The first mobile card 710 displays a note created by Mark Greenberg for the "Acme, Inc. 500 Widgets" opportunity. FIGS. 8A-8D show examples of expanded views of individual mobile cards of an opportunity feed, according to some implementations. FIG. 8A shows an example 810 of an expanded view of the first mobile card 710 of FIG. 7. The expanded view provides additional information related to the note created by Mark Greenberg. When the note is rolled up into the parent account container feed, the mobile card may display a portion of the content of the note. When the note is displayed in the Opportunity Feed 700, more social context may be provided, such as users associated with the note, and additional information updates associated with the note. Selecting the mobile card containing the note of the child opportunity in the account container feed may cause the feed of the child opportunity to be displayed, which may provide more social information related to the note.

In FIG. 7, the second mobile card 720 displays a hero post indicating a 160% increase in opportunity value for the "Acme, Inc. 500 Widgets" opportunity. In this example, the second mobile card 720 displayed in the opportunity feed corresponds to the sixth mobile card 560 displayed in the parent account container feed of FIG. 5. Because the "Acme, Inc. 500 Widgets" opportunity is a child of the Acme, Inc. account, the second mobile card 720 may be rolled up into the Acme, Inc. account container feed. In some implementations, selecting the sixth mobile card 560 of the account container feed 500 may cause the opportunity feed 700, and in particular the second mobile card 720, to be displayed on the mobile device. Selecting the second mobile card 720 may cause the mobile card to expand and display additional information related to the opportunity value increase.

Figure 8B:
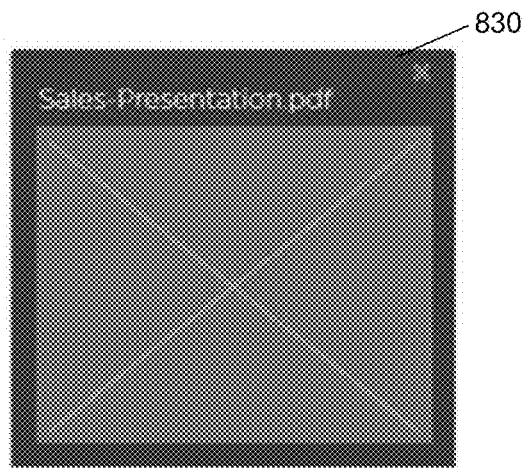

The third mobile card 730 displays previews of one or more attachments or files 582, 584 related to the "Acme Inc. 500 Widgets" opportunity. The attachments in this example were uploaded by John Davidson, a user of the on-demand service environment. Upon selection of the card, the user may be presented with the attached files in an immersive display on the mobile device. FIG. 8B shows an example 830 of what may be presented to a user in the mobile device display when one of the attached files is selected for display.

Figure 8C:
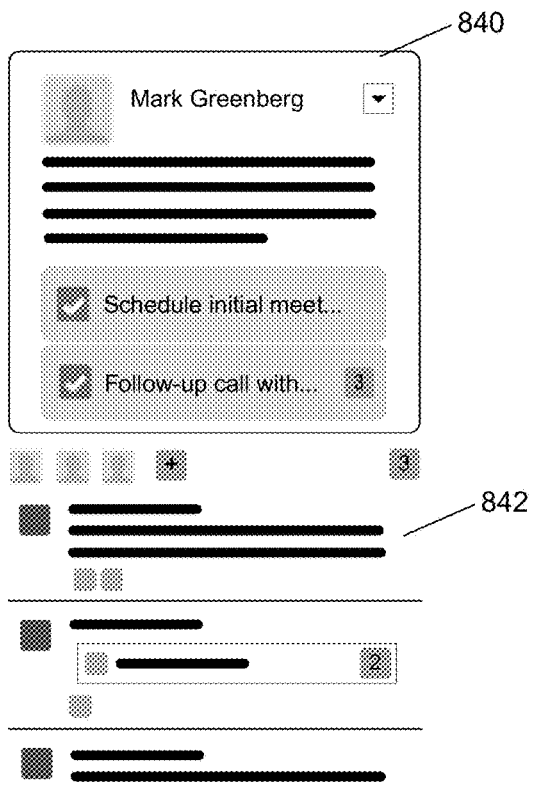

Returning to FIG. 7, the fourth mobile card 740 is a notification for two tasks 742, 744 associated with the user Mark Greenberg. As an example, Mark Greenberg may have assigned two tasks to the viewing user. Alternatively, Mark Greenberg may have created two tasks for the "Acme, Inc. 500 Widgets" opportunity that are visible to the viewing user. FIG. 8C shows an example 840 of what may be presented to the user when the fourth mobile card 740 is selected. The expanded view 840 displays the two tasks, as well as one or more information updates related to the tasks.

Figure 8D:
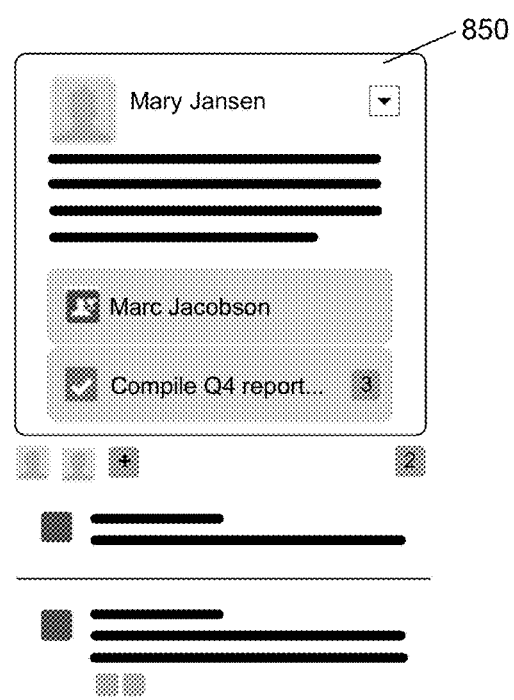

Returning to FIG. 7, the fifth mobile card 750 is a notification displaying two different actions associated with the user Mary Jansen. Here, she has created a contact "Marc Jacobsen" 752, and created a task "Compile Q4 repot . . . " 754. FIG. 8D shows an example 850 of what may be presented to the user when the fifth mobile card 750 is selected. The expanded view 850 displays the two actions and additionally provides two information updates associated with the actions. Instead of two separate posts, the on-demand service environment may provide this notification to include both updates related to Mary Jansen.

Returning to FIG. 7, the sixth mobile card 760 indicates an opportunity value increase of 85% for the "Acme Inc. 500 Widgets" opportunity.

Figure 9A:
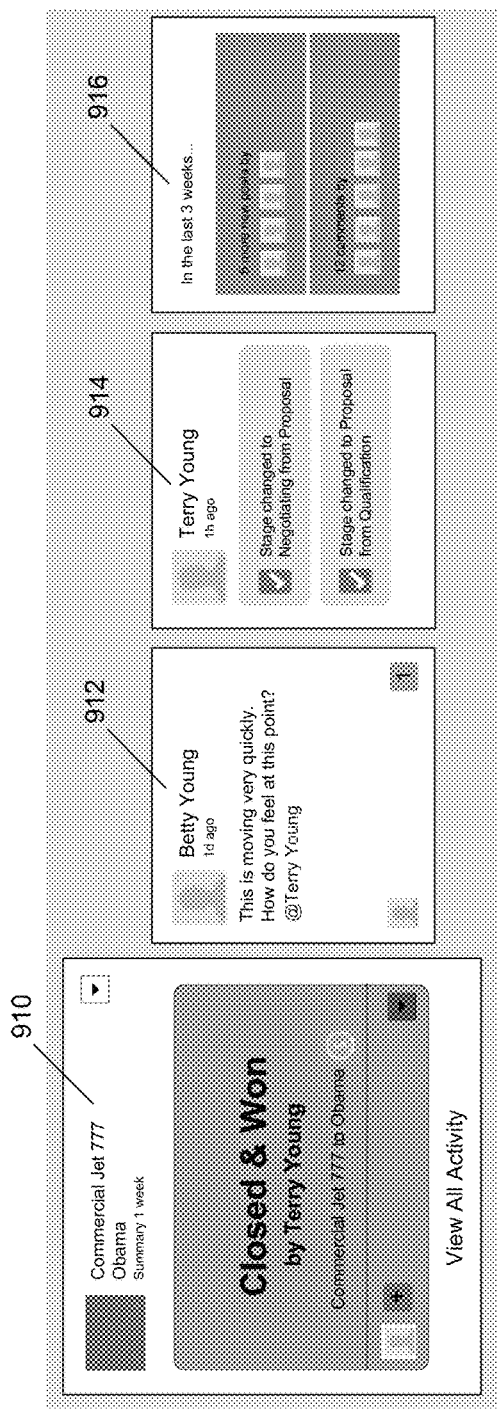
FIGS. 9A and 9B show examples of GUIs displaying information updates for an object of an on-demand service environment, according to some implementations.
Figure 9B:
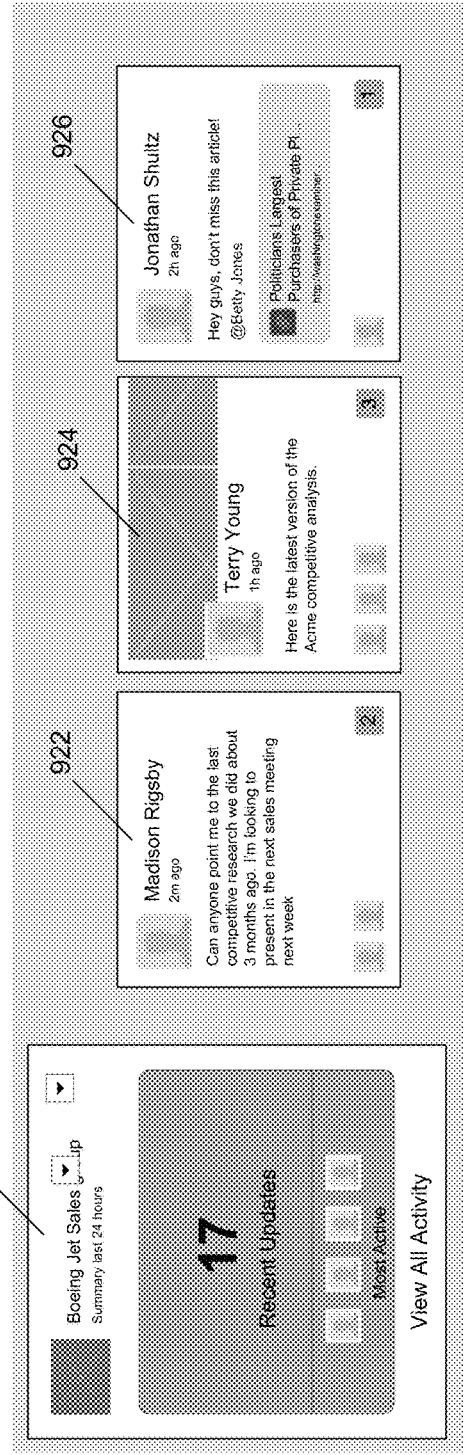

FIGS. 9A-9B show examples of a GUI displaying information updates for an object of an on-demand service environment, according to some implementations. FIG. 9A shows an example of how an opportunity "Commercial Jet 777 to Obama", which is a child object of the Obama parent account, may be displayed in an account container feed for the Obama parent account on a mobile device. The first mobile card 910, which is a hero post indicating that the child opportunity was closed and won by Terry Young, may be displayed in the container feed. By scrolling or swiping, other mobile cards related to the opportunity may be viewed by the user, such as a comment by Betty Young 912, changes to the opportunity made by Terry Young 914, and a summary of other users interacting with the opportunity 916. For a user browsing the Obama parent account, the hero post, which was rolled up from the "Commercial Jet 777 to Obama" child opportunity allows the user to quickly view relevant information for this opportunity associated with the Obama account.

FIG. 9B shows an example of how information updates for a group "Boeing Jet Sales group", which is a child object of the parent Boeing account, may be rolled up into an account container feed for the Boeing account. A hero post 920 may appear in the Boeing account container feed indicating that there are 17 recent updates to the child Boeing Jet Sales group, with a summary of the most active users in the group. Again, by scrolling or swiping the hero post, the user may view the various updates for the group made by members of the group. In some implementations, a relevancy algorithm may be used to identify and display the most relevant cards in order of relevance. For example, the cards may be displayed in order of how recently they were created. In this example, swiping the hero post may display the comment made by Madison Rigsby 922, followed by the files attached by Terry Young 924, and the article attached by Jonathan Shultz 926. In this way, the most relevant information for the Boeing Jet Sales group may be rolled up into the parent account container feed for a user to view without having to individually open up the dedicated feed associated specifically with the Being Jet Sales group.

Returning to FIG. 3, at block 308, the computing device performing method 300 identifies, based on one or more of a plurality of criteria, a first plurality of information updates associated with a first child object. The first child object has a child relationship with the parent object in the hierarchical model.

In some implementations, the one or more criteria may indicate one or more of: a position, a role, or a personalization setting. Depending on the position of the user in the company, certain types of information updates may be selected to be displayed in the parent container feed. For example, a top executive of a company may be more interested in high-level updates for an account than detailed day-to-day updates. As such, the one or more criteria may identify comments made by higher level managers as more relevant for a top executive user. Alternatively, the criteria might identify closed and won opportunities for the account as relevant information for a top executive user. Also, the criteria might identify new tasks as irrelevant for a top executive user browsing the account container feed.

In another implementation, a user of the on-demand service environment may identify certain types of information updates that he is interested in viewing. For example, a user may be interested in updates associated with cases, but not opportunities, and may designate that updates to cases associated with the parent account object be displayed in the parent account container feed. A user may indicate this preference as part of the user's set of personalization options. In some implementations, the user's account settings may include personalization options for rolling up particular types of updates into a parent container feed.

In some implementations, one of the criteria may identify a property of the first child object, wherein the one criterion is satisfied when an information update indicates a change to the identified property. In some implementations, another criterion may identify a threshold value for changes to the identified property, wherein the other criterion is satisfied when the change to the identified property meets or exceeds the threshold value.

As an example, a hero post may be generated based on a predetermined trigger, such as an opportunity value or a percentage change in opportunity value. For example, the threshold value for the opportunity value may be $1,000,000, such that updates that result in the opportunity value exceeding $1,000,000 may be rolled up and included in the parent container feed. As another example, the threshold may be a 100% increase in opportunity value, such that updates that result in the opportunity value increasing by more than 100% may be included in the parent container feed. Referring back to FIG. 7, there are two mobile cards 720 and 760 in the opportunity feed that display percentage increases in opportunity value. In that example, the threshold value for rolling up the mobile card into the account container feed may be 100%. As such, the account container feed of FIG. 5 only displays the 160% increase in a mobile card 560, and the update including the 85% increase does not get rolled up into the parent account container feed.

As another example, the identified property of the first child object may be the closing date of an opportunity, such that when an update involves a change to the closing date of an opportunity, that update may be rolled up into the account container feed. For example, in FIG. 5, mobile card 570 displays the close date for the "Acme 3 k Widgets" opportunity moving to the first quarter (Q1). In this example, there may be a criterion designating the close date attribute of child opportunities as an attribute to track and roll up into the parent account container feed.

In some implementations, one of the criteria may identify a child object type, wherein the criterion is satisfied when an information update indicates creating, deleting, or updating a child object having the child object type. As an example, the criteria may specify that all new child opportunities for a parent account should be rolled up into the account container feed. As another example, all opportunities that are closed or removed should also be rolled up into the account container feed. In FIG. 5, the fourth mobile card 540 shows five new contacts that were created in association with the account. In this example, the criteria may designate the contact object type, such that updates to child contacts for a parent account should be rolled up into the account container feed.

In some implementations, the one or more criteria may indicate a timestamp of an information update, a count of information updates, a type of information updates, an author of an information update, a count of published comments associated with an information update, and a count of shares of an information update. As an example, specific interactions with particular record types, such as notes on a contact determined to be a decision maker for an opportunity, may be rolled up and displayed in a mobile card of the parent container feed. Any of these properties of the information updates may be utilized in criteria for determining which information updates should be identified for publication in the parent container feed.

In FIG. 3, at block 312, the computing device performing method 300 identifies a second plurality of information updates associated with the parent object. FIG. 5 provides some examples of information updates associated with the parent object that may be identified, such as new contacts for the account 540 or files attached to the account 580. In some implementations, the second plurality of information updates may include one or more updates to particular attribute fields of the parent object. A user of the on-demand environment may designate which of the attribute fields of the parent object should be "tracked"; that is, for which attributes should an information update be generated when the attribute value changes. For example, a user may designate that the attribute fields that he is interested in tracking for an account object are the account billing address and the account type (e.g. Customer, Competitor, or Partner).

In FIG. 3, at block 316, the computing device performing method 300 generates a set of feed items representing the first set of information updates. For example, in FIG. 6, the second mobile card 520 shows six tasks for an opportunity that have been grouped into a single mobile card for display in the container feed. In another implementation, updates may be grouped by a particular user that is common to the updates. For example, if a user creates a new contact and creates a new task, both of those updates may be provided in a single card in the parent container feed. In yet another implementation, updates may be grouped by timestamp, wherein all updates within the past minute, hour, or day, are grouped in a single card.

In some implementations, a first child feed item may include information indicating one or more of: a change in a property of the first child object, creation of the first child object, or deletion of the first child object. In another implementation, the first child feed item may include one or more indicators configured to graphically differentiate the first child feed item from other feed items of the parent container feed when the parent container feed is displayed. As an example, the hero post 530 of FIG. 5 is highlighted in a different color to graphically differentiate the hero post from the cards of the account container feed.

In FIG. 3, at block 320, the computing device performing method 300 generates a second set of feed items identifying the second plurality of information updates. The updates may be grouped within the feed items in a manner similar to the methods described in block 316 of FIG. 3.

In FIG. 3, at block 324, the computing device performing method 300 displays, on the mobile device, the first and second sets of feed items in the parent container feed. In some implementations, the feed items are displayed on the display of a mobile device. The user may browse the feed items on the mobile device by swiping or scrolling between the feed items. Depending on the size of the display, a feed item may contain a summarized or collapsed version of the information in the updates. Selecting a feed item may cause an expanded version of the feed item to be displayed on the mobile device, allowing the user to see more information.

FIGS. 4A-4C show flowcharts of examples of computer-implemented methods 430A-430C for receiving a selection in accordance with method 300, according to some implementations. The methods 430A-430C can be performed by or using any suitable computing device, computing system or any number of computing devices or systems that may cooperate to perform the methods 430A-430C. In some implementations, each of the blocks of a method of FIGS. 4A-4C can be performed wholly or partially by or using the database system 16 of FIGS. 1A and 1B, or other suitable devices or components (including processors) described herein, or the like.

In FIG. 4A, at block 432, the computing device performing method 430A receives a selection of the first child feed item, the first child feed item having a collapsed view. The collapsed view may provide some information from the updates identified in the first child feed item. In some implementations, on a mobile device, the received selection may be a result of the user pressing or clicking on the first child feed item in the display.

In FIG. 4A, at block 434, the computing device performing method 430A provides for display an expanded view of the first child feed item. The expanded view may identify one or more additional information updates not appearing in the collapsed view of the first child feed item. As an example, a user viewing the account container feed of FIG. 5 may select the first mobile card 510 for expansion by selecting the show more button 516. As a result, the user's device may display the mobile card 610 of FIG. 6A, which provides additional information related to the note on the opportunity 518 embodied in the mobile card 510 created by Mark Greenberg and illustrated in FIG. 5.

In FIG. 4B, at block 436, the computing device performing method 430B receives a selection of the first child feed item, as generally described above in block 432 of FIG. 4A.

In FIG. 4B, at block 438, the computing device performing method 430B provides for display a child feed including only child feed items identifying information updates associated with the first child object. As an example, a user viewing the account container feed of FIG. 5 may navigate to the "Acme Inc. 500 Widgets" opportunity feed by selecting the "Acme 500 Widgets" opportunity name on the first mobile card 510, which is a rolled up card from the "Acme Inc. 500 Widgets" opportunity feed. As a result, the user's display may display the opportunity feed 700 for the "Acme Inc. 500 Widgets" opportunity.

In FIG. 4C, at block 440, the computing device performing method 430C receives a request via a create command to create a second child object related to the first child object from the parent container feed. As an example, a user viewing an update for an opportunity within an account container feed may select a create command requesting that a new contact for the opportunity be created. The create command may be presented to the user in a menu of actions that may be performed from the account container feed.

In FIG. 4C, at block 442, the computing device performing method 430C creates the second child object, the second child object including one or more attributes determined based on the information in the request to create the second child object. Continuing the example above in block 440, the user, when he selects the create command requesting to create a new contact for the opportunity, may be presented with one or more attribute fields for the new contact, such as name, email, and phone number. The user may provide these attributes and request that a new contact object be created and associated with the opportunity. Instead of having to switch over to the opportunity feed to create the new contact, the user may create the new contact within the account container feed via the rolled up opportunity feed item. In this way, a user may interact with different child feeds from the parent container feed without having to drill into each child feed to perform actions associated with the child object.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for displaying content of an enterprise social network feed on a mobile device, the system comprising:
   a database system implemented using a server system, the database system configurable to cause:
   processing a request from a mobile device to display a parent container feed of an enterprise social networking system, the parent container feed defined at least in part as being linked with a parent customer relationship management (CRM) record stored in a CRM database, the parent CRM record having a parent-child relationship in a hierarchical database model with a plurality of child CRM records stored in the CRM database;
   identifying, using the hierarchical database model and the child CRM records, a first plurality of information updates associated with a first one or more of the child CRM records as satisfying a criterion or criteria;
   identifying, using the hierarchical database model and the parent CRM record, a second plurality of information updates associated with the parent CRM record;
   defining, using a first one or more feed data objects stored in a feed database, a first set of feed items comprising the first plurality of information updates;
   defining, using a second one or more feed data objects stored in the feed database, a second set of feed items comprising the second plurality of information updates; and
   generating data to be processed to cause display of a presentation of the parent container feed in a user interface on a display of the mobile device, the presentation of the parent container feed identifying the linked parent CRM record and comprising a plurality of graphical cards comprising:
   a first graphical card having a collapsed display state partially exposing first content of the first plurality of information updates, the first graphical card being selectable via the user interface to have an expanded display state fully exposing the first content and exposing a plurality of enterprise work-related data items stored in the CRM database in association with the first one or more child CRM records, the enterprise work-related data items being retrievable using the database association between the enterprise work-related data items and the first one or more child CRM records, the enterprise work-related data items identifying at least a customer relationship action to be performed to cause updating of one or more CRM record fields defining a progress state of a first child CRM record, and
   a second graphical card having a collapsed display state partially exposing second content of the second plurality of information updates, the second graphical card being selectable via the user interface to have an expanded display state fully exposing the second content.

2. The system of claim 1, wherein an information update identifies one or more of: a change in a property of the first one or more child CRM records, creation of the first one or more child CRM records, or deletion of the first one or more child CRM records.

3. The system of claim 1, wherein a feed item comprises one or more indicators configured to graphically differentiate the feed item from other feed items in the parent container feed.

4. The system of claim 1, the database system further configurable to cause:
   processing a selection of the first graphical card; and
   displaying the expanded state of the first graphical card, the expanded state identifying one or more additional information updates not appearing in the collapsed state.

5. The system of claim 1, the database system further configurable to cause:
   processing a selection of the second graphical card; and
   displaying the expanded state of the second graphical card.

6. The system of claim 1, wherein the first graphical card comprises one or more create commands, the database system further configurable to cause:
   processing a request via a create command to create a second child CRM record related to the first one or more child CRM records; and
   creating the second child CRM record, the second child CRM record comprising one or more attributes determined based on information in the request to create the second child CRM record.

7. The system of claim 1, wherein the criteria indicate one or more of: a position, a role, or a personalization setting.

8. The system of claim 1, wherein the criterion identifies a property of the first one or more child CRM records, the criterion being satisfied when an information update indicates a change to the identified property.

9. The system of claim 8, wherein a further criterion identifies a threshold value for changes to the identified property, the further criterion being satisfied when the change to the identified property meets or exceeds the threshold value.

10. The system of claim 1, wherein the criterion identifies a child CRM record type, the criterion being satisfied when an information update indicates an action on a child CRM record having the child CRM record type.

11. The system of claim 1, wherein the criteria indicate one or more of: a timestamp of an information update, a range of timestamps of information updates, a count of information updates, a type of information updates, an author of an information update, a count of published comments associated with an information update, or a count of shares of an information update.

12. The system of claim 1, wherein the parent container feed comprises one of: an account container feed, an opportunity container feed, a contact container feed, a lead container feed, a case container feed, a report container feed, a task container feed, an event container feed, a dashboard container feed, or an asset container feed.

13. The system of claim 1, wherein the first one or more child CRM records has a child relationship with only the parent CRM record in the hierarchical database model.

14. The system of claim 1, wherein the first one or more child CRM records has a child relationship with a plurality of parent CRM records in the hierarchical database model.

15. A method for displaying content of an enterprise social network feed on a mobile device, the method comprising:
receiving a request from a mobile device to display a parent container feed of an enterprise social networking system, the parent container feed defined at least in part as being linked with a parent customer relationship management (CRM) record stored in a CRM database, the parent CRM record having a parent-child relationship in a hierarchical database model with a plurality of child CRM records stored in the CRM database;
identifying, using the hierarchical database model and the child CRM records, a first plurality of information updates associated with a first one or more of the child CRM records as satisfying a criterion or criteria;
identifying, using the hierarchical database model and the parent CRM record, a second plurality of information updates associated with the parent CRM record;
defining, using a first one or more feed data objects stored in a feed database, a first set of feed items comprising the first plurality of information updates;
defining, using a second one or more feed data objects stored in the feed database, a second set of feed items comprising the second plurality of information updates; and
causing data to be generated to display a presentation of the parent container feed in a user interface on a display of the mobile device, the presentation of the parent container feed identifying the linked parent CRM record and comprising a plurality of graphical cards comprising:
a first graphical card having a collapsed display state partially exposing first content of the first plurality of information updates, the first graphical card being selectable via the user interface to have an expanded display state fully exposing the first content and exposing a plurality of enterprise work-related data items stored in the CRM database in association with the first one or more child CRM records, the enterprise work-related data items being retrievable using the database association between the enterprise work-related data items and the first one or more child CRM records, the enterprise work-related data items identifying at least a customer relationship action to be performed to cause updating of one or more CRM record fields defining a progress state of a first child CRM record, and
a second graphical card having a collapsed display state partially exposing second content of the second plurality of information updates, the second graphical card being selectable via the user interface to have an expanded display state fully exposing the second content.

16. The method of claim 15, the method further comprising:
receiving a selection of the first graphical card; and
providing for display the expanded state of the first graphical card, the expanded state identifying one or more additional information updates not appearing in the collapsed state.

17. The method of claim 15, the method further comprising:
receiving a selection of the second graphical card; and
providing for display the expanded state of the second graphical card.

18. A computer program product comprising computer-readable program code to be executed by one or more processors when retrieved from a non-transitory computer-readable medium, the program code comprising instructions configured to cause:
processing a request from a mobile device to display a parent container feed of an enterprise social networking system, the parent container feed defined at least in part as being linked with a parent customer relationship management (CRM) record stored in a CRM database, the parent CRM record having a parent-child relationship in a hierarchical database model with a plurality of child CRM records stored in the CRM database;
identifying, using the hierarchical database model and the child CRM records, a first plurality of information updates associated with a first one or more of the child CRM records as satisfying a criterion or criteria;
identifying, using the hierarchical database model and the parent CRM record, a second plurality of information updates associated with the parent CRM record;
defining, using a first one or more feed data objects stored in a feed database, a first set of feed items comprising the first plurality of information updates;
defining, using a second one or more feed data objects stored in the feed database, a second set of feed items comprising the second plurality of information updates; and
generating data to be processed to cause display of a presentation of the parent container feed in a user interface on a display of the mobile device, the presentation of the parent container feed identifying the linked parent CRM record and comprising a plurality of graphical cards comprising:
a first graphical card having a collapsed display state partially exposing first content of the first plurality of information updates, the first graphical card being selectable via the user interface to have an expanded display state fully exposing the first content and exposing a plurality of enterprise work-related data items stored in the CRM database in association with the first one or more child CRM records, the enterprise work-related data items being retrievable using the database association between the enterprise work-related data items and the first one or more child CRM records, the enterprise work-related data items identifying at least a customer relationship action to be performed to cause updating of one or more CRM record fields defining a progress state of a first child CRM record, and a second graphical card having a collapsed display state partially exposing second content of the second plurality of information updates, the second graphical card being selectable via the user interface to have an expanded display state fully exposing the second content.

19. The computer program product of claim 18, the program code further comprising instructions configured to cause:

processing a selection of the first graphical card; and providing for display the expanded state of the first graphical card, the expanded state identifying one or more additional information updates not appearing in the collapsed state.

20. The computer program product of claim 18, the program code further comprising instructions configured to cause:

processing a selection of the second graphical card; and providing for display the expanded state of the second graphical card.

* * * * *